(12) United States Patent
Carriere et al.

(10) Patent No.: US 12,546,296 B2
(45) Date of Patent: Feb. 10, 2026

(54) CYLINDER IN PARTICULAR FOR HYDROGEN TANK CYCLING FACILITY

(71) Applicant: Commissariat à l'Energie Atomique et aux Energies Alternatives, Paris (FR)

(72) Inventors: Stéphane Carriere, Paris (FR); Stéphane Villalonga, Paris (FR)

(73) Assignee: Commissariat À L'energie Atomique Et Aux Energies Alternatives, Paris (FR)

( * ) Notice: Subject to any disclaimer, the term of this patent is extended or adjusted under 35 U.S.C. 154(b) by 0 days.

(21) Appl. No.: 18/625,640

(22) Filed: Apr. 3, 2024

(65) Prior Publication Data

US 2024/0328439 A1 Oct. 3, 2024

(30) Foreign Application Priority Data

Apr. 3, 2023 (FR) .................................. 2303302

(51) Int. Cl.
| | |
|---|---|
| *F04B 19/00* | (2006.01) |
| *F04B 9/117* | (2006.01) |
| *F04B 15/08* | (2006.01) |
| *F04B 53/10* | (2006.01) |

(52) U.S. Cl.
CPC .............. *F04B 19/003* (2013.01); *F04B 9/117* (2013.01); *F04B 2015/0822* (2013.01); *F04B 53/10* (2013.01)

(58) Field of Classification Search
CPC .... F15B 15/1428; F04B 9/117; F04B 19/003; F04B 2015/0822
See application file for complete search history.

(56) References Cited

U.S. PATENT DOCUMENTS

| | | | | |
|---|---|---|---|---|
| 2,487,390 | A | * | 11/1949 | Smith ...................... F16J 1/008 92/254 |
| 3,818,808 | A | * | 6/1974 | Shafer ................. F16K 31/1635 92/138 |
| 3,997,887 | A | * | 12/1976 | Poynter ............... F15B 15/2815 33/DIG. 15 |
| 4,470,771 | A | | 9/1984 | Hall et al. |
| 2016/0053559 | A1 | * | 2/2016 | Alley .................... E21B 23/042 166/212 |

FOREIGN PATENT DOCUMENTS

| | | |
|---|---|---|
| EP | 3318768 A1 | 5/2018 |
| WO | 94/25755 A1 | 11/1994 |

OTHER PUBLICATIONS

Search Report and Opinion issued on Jan. 23, 2024, in corresponding French Application No. 2303302, 14 pages.

* cited by examiner

*Primary Examiner* — Dustin T Nguyen
(74) *Attorney, Agent, or Firm* — Maier & Maier, PLLC

(57) ABSTRACT

A hydraulic cylinder, in particular for a hydrogen tank pressurization installation, including a cylindrical body of longitudinal axis having a first low-pressure cylindrical body portion and a second high-pressure cylindrical body portion, a piston being mounted in the first cylindrical body portion and being mounted at a first end of a piston rod slidably extending in the second cylindrical body portion. A second end of the rod opposite the first end carries a removable cartridge slidably sealed in the second part of the cylindrical body, the second part of the cylindrical body being sealed by a removable shutter member arranged longitudinally opposite the removable cartridge.

8 Claims, 9 Drawing Sheets

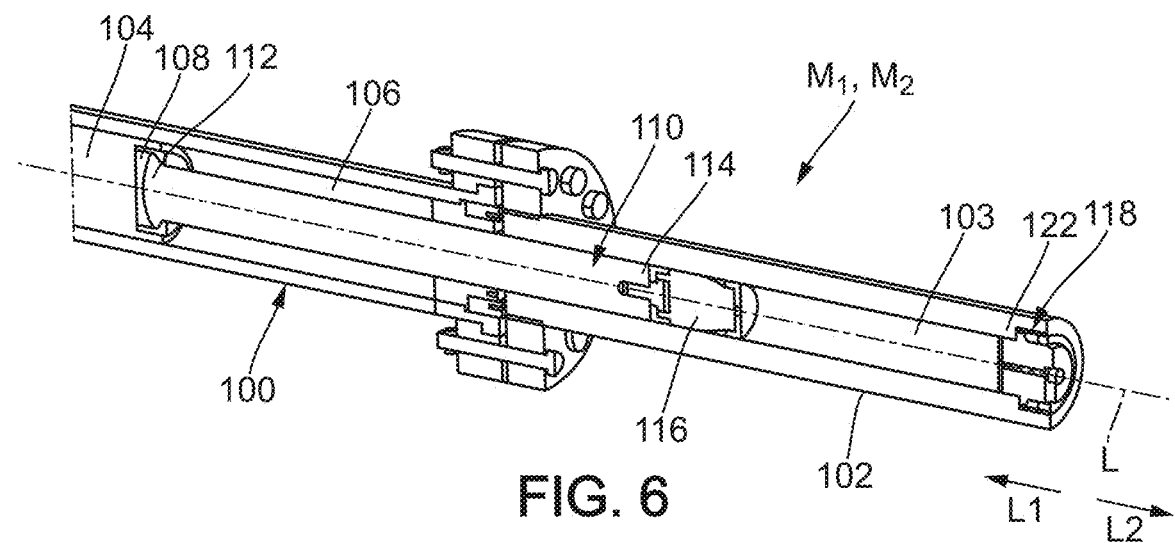
FIG. 6
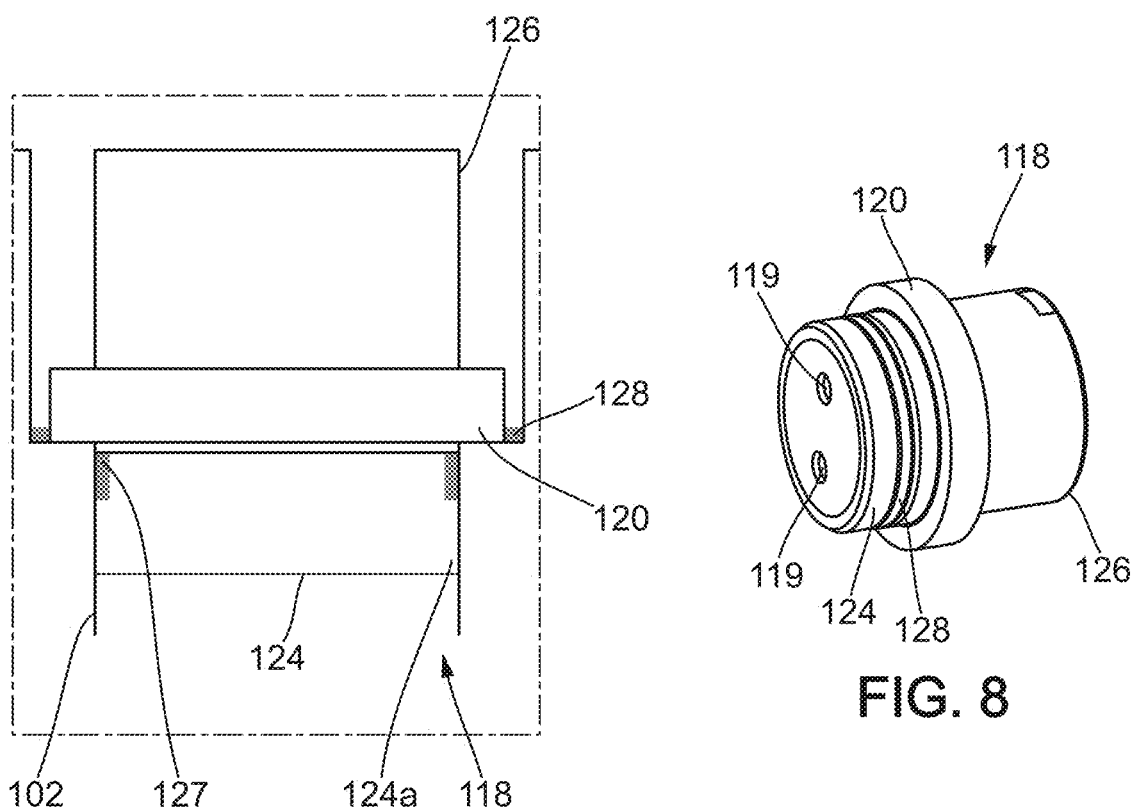
FIG. 7
FIG. 8

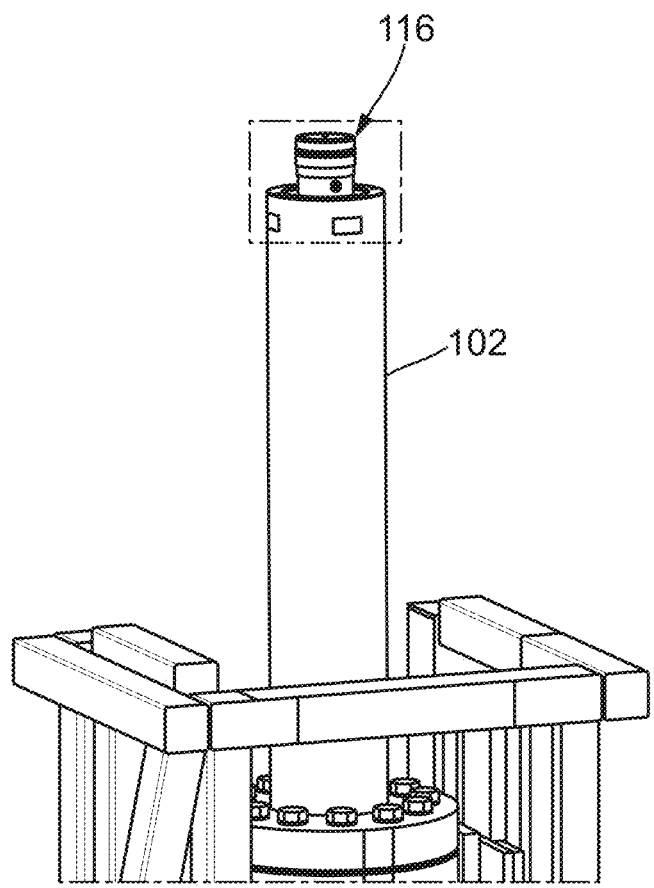
FIG.10A
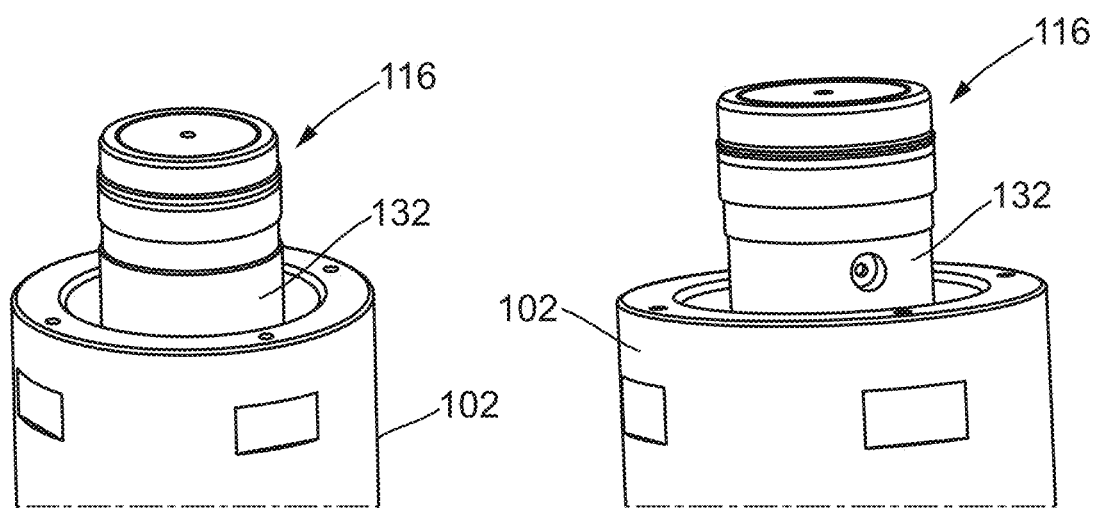
FIG. 10B   FIG. 10C

CYLINDER IN PARTICULAR FOR HYDROGEN TANK CYCLING FACILITY

TECHNICAL FIELD

The contents of the application relate to facilities and devices for cycling a hydrogen tank.

BACKGROUND

A hydraulic cycling test bench for a hydrogen gas storage tank is designed, as its name suggests, to carry out pressure cycling of a hydrogen tank in order to check its mechanical strength capabilities. This type of facility should enable a tank to be cyclically tested under temperature conditions ranging from −40° C. to +85° C.

Several facilities currently exist, generally comprising a fluid circuit with at least one multiplier for increasing fluid pressure in the circuit to the tanks. These facilities generally operate with a first oil fluid from a hydraulic station supplying the multiplier with low pressure, and a second working fluid generally consisting of glycol water circulating in the high-pressure part of the circuit. Glycol water is chosen because of the possibility of carrying out cycling tests at all temperatures, and more specifically at negative temperatures.

This type of facility raises a number of issues. Firstly, glycol water leads to high pressure loss in the circuit, making it more difficult to control pressure variations required for cycling. Thus, when it is desired to test a tank at room temperature or at low temperature, the high-pressure glycol water circuit is indifferently used.

Moreover, cycling a tank with glycol water leads to significant heating of the fluid, which implies the addition of additional heat exchangers to lower the temperature so that cycling at room temperature can be carried out with a proper temperature setpoint.

It is also noted that the handling of a multiplier of prior art is tricky since assembly/disassembly is delicate. Indeed, in use, a multiplier is arranged in a vertical position to clearly save space and to ensure uniform wear of the sealing parts during operation. However, maintenance needs to be carried out in a horizontal position, which proves complicated since it is appropriate to have a facility for switching the multiplier between the horizontal position and the vertical position, and this type of facility is generally of large overall size. In addition, sealing between the low-pressure and high-pressure parts has to be checked, and also requires maintenance operations that prove also to be complicated.

Cold cycling is very energy-intensive, the same cycling facility is used for both room-temperature and low-temperature cycling, so it is necessary to cool the entire glycol water circuit that extends from the multiplier(s) to the tank being cycling tested.

It is also noted that filling the hydrogen tanks and multipliers is done manually, and that the fluid connection circuit to the tank is done manually, which is tedious and does not ensure that the circuit is free of air bubbles that could interfere with the tank cycling test. The presence of air in the circuit may disturb testing and the proper operation of the facility. In addition, air pockets disturb checking instruments.

SUMMARY

The present document therefore relates to a hydraulic cylinder, in particular for a hydrogen tank pressurization installation, comprising a cylindrical body of longitudinal axis having a first low-pressure cylindrical body portion and a second high-pressure cylindrical body portion, a piston being mounted in the first cylindrical body portion and being mounted at a first end of a piston rod slidably extending in the second cylindrical body portion, wherein a second end of the rod opposite the first end carries a removable cartridge slidably sealed in said second part of the cylindrical body, the second part of the cylindrical body being sealed by a removable shutter member arranged longitudinally opposite the removable cartridge.

Piston maintenance operations are facilitated by access to the internal volume of the second cylindrical body part via the shutter member that is removable. Cylinder maintenance can thus be carried out in a vertical position.

According to another feature, the shutter member comprises an annular rim engaged in abutment along a first direction of the longitudinal axis on a corresponding annular rim of the second part of the cylindrical body.

The shutter member may comprise a first cylindrical portion and a second cylindrical portion separated from each other by the annular rim of the shutter member.

The first part may comprise a thread screwed onto a corresponding thread of the second part of the cylindrical body.

A first annular seal, preferably an O-ring, for example made of Teflon®, can be arranged between the thread and the annular rim of the shutter member.

A second annular seal can be clamped between the annular flange of the shutter member and the second part of the cylindrical body, this second seal being made, for example, of thermoplastic.

The shutter member can be locked in translation, along a second direction of the longitudinal direction, by an annular yoke screwed onto a thread of an internal surface of the second part of the cylindrical body.

In this configuration, the annular yoke can thus clamp the annular rim of the shutter member to the annular rim of the cylindrical body.

The annular yoke may comprise means for attaching a yoke clamping/unclamping member.

The removable cartridge may comprise an annular seal locked longitudinally by annular clamping rings.

The cartridge may comprise an annular shoulder against which a first of the rings is applied. The annular seal is then engaged so as to come into contact with the first ring. The second ring can be fixed, for example, by screwing onto a cylindrical portion of the second ring.

The cartridge can be locked by a pin device on a longitudinal extension of the rod inserted in the cartridge.

The first portion of the cylindrical body may comprise a first chamber and a second chamber separated from each other by the piston, the first chamber and the second chamber being intended to be supplied with a first fluid.

The shutter member may comprise an orifice for the passage of a pressurized fluid housed in the second cylindrical body portion.

The formation of an orifice for the passage of a liquid at the level of the cylindrical body would lead to the formation of a brittleness on the body. On the contrary, the use of a sealing member makes the cylindrical body more difficult to fabricate and less subject to mechanical brittleness. In addition, the flow through the removable shutter reduces pressure loss compared with the previous technique. Finally, the obturator can be easily replaced, which is simple and inexpensive.

The first part of the cylindrical body can be connected to a first circuit of a first low-pressure fluid and the second part of the cylindrical body is connected to a second circuit of a second high-pressure fluid. The closure member may comprise at least one longitudinally extending channel fluidly connecting the interior, i.e. the internal volume, of the second cylindrical body portion to the second circuit.

Unlike previous technology, the multiplier's high-pressure outlet orifice is formed along the axis of the piston, which limits pressure losses compared with an orifice formed in the wall of the second cylindrical body part. In addition, this orifice is offset on a removable part, enabling it to be replaced quickly and easily for low-cost maintenance.

BRIEF DESCRIPTION OF THE DRAWINGS

Further characteristics, details and advantages will become apparent upon reading the detailed description below, and upon examining the appended drawings, in which:

FIG. 6 illustrates a multiplier according to the present document;

FIG. 7 illustrates a cross-section view of a shutter along one end of the second cylindrical body part of the multiplier of FIG. 6;

FIG. 8 illustrates a perspective view of the shutter;

FIG. 10 comprises three parts A, B and C respectively named FIG. 10A, FIG. 10B and FIG. 10C in the detailed description below, FIG. 10A illustrating a multiplier according to the present document and in a vertical position, a sealing cartridge being visible at an upper end of the multiplier and in a disassembly position for maintenance, FIGS. 10B and 10C being larger-scale views of the zone delimited in dotted lines in FIG. 10A and in two different orientations about a longitudinal axis of the multiplier;

DETAILED DESCRIPTION

Figure 1:
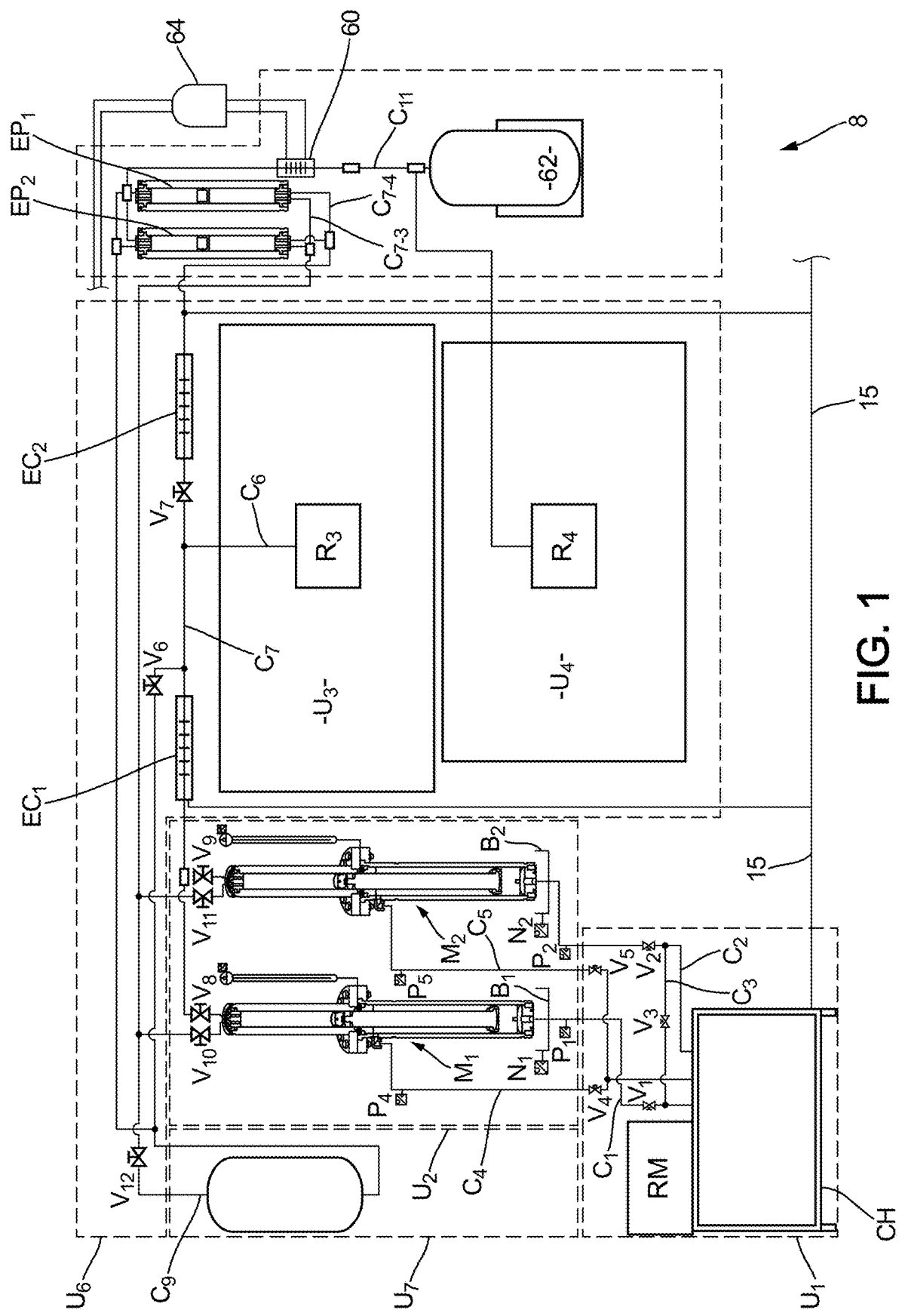
FIG. 1 illustrates a cold and room temperature cycling facility according to the present document.

Reference is first made to FIG. 1, which represents a cycling test facility 8 for a hydrogen tank comprising:

a first, low-pressure circuit 10 for circulating a first fluid with a first viscosity, preferably, the first circuit comprises a fluid for protecting components from corrosion. It also facilitates equipment sealing, by virtue of its adapted viscosity, and promotes good hydraulic performance. Preferably, the first fluid will be an oil of a particular type as described below, a second, high-pressure circuit 12 for circulating a second fluid having a second viscosity lower than the viscosity of the first fluid, the second circuit 12 and the first circuit 10 can be arranged in a same enclosure at room temperature, a third, high-pressure circuit 14 for circulating a third fluid with a melting point lower than that of the first fluid, and preferably of at most −40° C., at least one multiplier M1, M2 arranged at the junction of the first circuit and the second circuit.

At least one separator EP1, EP2 is arranged at the junction between the second circuit and the third circuit. Thus configured, the first circuit is fluidly independent of the second circuit, which in turn is independent of the third circuit. As will become apparent from the following description, the first circuit supplies a working pressure which is communicated to the second circuit, this second circuit communicating the pressure to the third circuit.

The term "multiplier" is understood to mean a member which multiplies the pressure between an inlet and the outlet. In the present document, the multiplier makes it possible to increase the pressure in the second circuit, i.e. multiply the pressure, with respect to the pressure in the first circuit.

Figure 2:
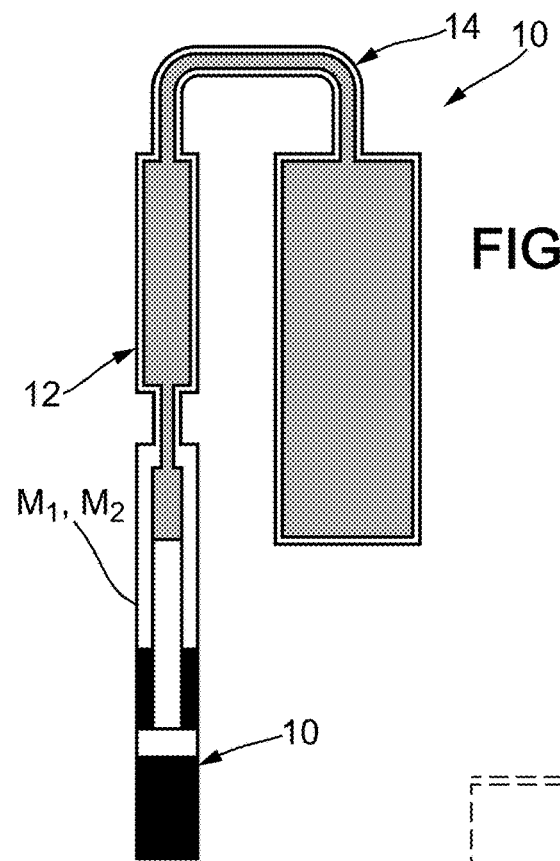
FIG. 2 schematically illustrates the facility of FIG. 1.

The principle of cooperation of the three fluidic circuits is illustrated in FIG. 2. The combination of three fluid, here liquid, circuits, provides proper thermal management of the facility. In particular, the addition of a second circuit 12, whose fluid has a lower viscosity than that of the first fluid and which is distinct from the first and third fluids, makes it possible to reduce pressure loss. In particular, in one exemplary embodiment, the first fluid may be an oil having for example a grade of at least 46, the second fluid may be water and the third fluid may be glycol water, for example monopropylene glycol. This third fluid can withstand very cold temperatures required for very low-temperature cycling tests. The second fluid interposed in the circuitry between the first circuit and the third circuit, in that it is the second fluid which ensures transmission of the initial pressure provided by the first circuit, makes it possible to reduce length of the glycol water circuit and therefore pressure loss.

Figure 3:
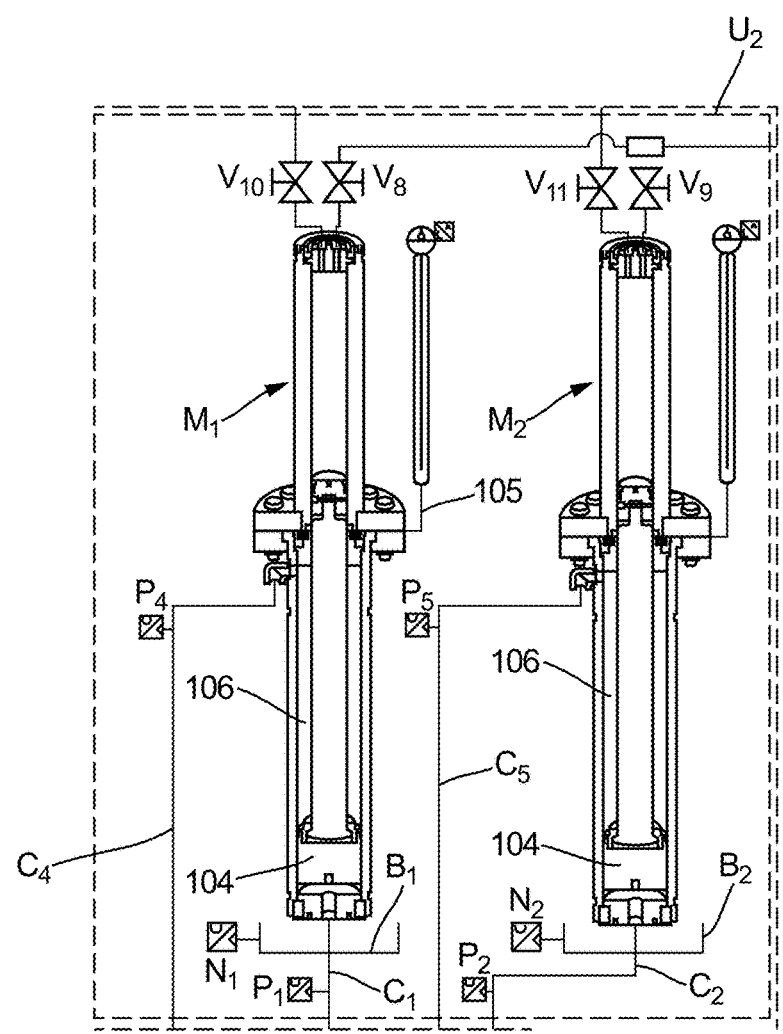
FIG. 3 illustrates the pressurization unit of the cycling facility of FIG. 1, this unit comprising at least one multiplier, and in the example represented it comprises two.

More precisely, the facility comprises a plurality of units:

A hydraulic supply unit U1 including a hydraulic station CH installed in the first circuit and more particularly housed in a machine room;

A pressurization multiplier unit U2 (FIGS. 1 and 3) comprising at least one multiplier and in this case at least two multipliers M1, M2 and more particularly exactly two multipliers as illustrated in the figures, each multiplier M1, M2 comprising a cylindrical body formed by a first low-pressure cylindrical body part 100 and a second high-pressure cylindrical body part 102, the first cylindrical body part 100 housing a piston 108 separating a first chamber 104 formed in a bottom part of the first cylindrical body part 100 and a second chamber 106 formed in a top part of the first cylindrical body part 100 (FIG. 6). Other characteristics of the multiplier M1, M2 are described subsequently.

A unit U3 for managing the second fluid,

A unit U4 for managing the third fluid,

A unit U5 comprising an enclosure with a temperature controllable over a temperature range from at least −40° C. to +85° C. and entirely housing the third circuit, this enclosure allowing tests at extreme temperatures but also tests at room temperature, An air generation and treatment unit U6 for controlling the controlled valves of units U3 and U4 essentially, A unit U7 designed, for example, to perform cycling tests at room temperature, which can be carried out using the second circuit, the third circuit not being necessary.

The hydraulic supply unit makes it possible to provide energy needed to fill hydrogen tanks up to a maximum pressure of 350 bar, and enables cycling from 0 to 350 bar. The hydraulic station CH includes at least one, preferably at least two, motor-pump units connected to distributor brains for recirculation of the first fluid into a tank of at least 1000 liters, preferably at least 1200 liters, equipped with valves, pressure filters and return pressure filters.

The first circuit comprises a first duct equipped with a first controlled valve V1 which connects the hydraulic supply unit, more particularly a first motor pump unit, to the bottom part of the first multiplier M1. The first duct may comprise a pressure sensor P1. The first circuit comprises a second duct equipped with a second controlled valve V2 which connects the bottom part of the second multiplier M2 to the hydraulic supply unit, more particularly a second motor pump unit. The second duct C2 may comprise a pressure sensor P2. The first duct and the second duct are connected together through a third duct equipped with a third controlled valve V3. If the third valve V3 is open, both multipliers M1 and M2 operate simultaneously. The first valve V1 and the second valve V2 can only be in the open state (fluid passage enabled) at the same time if the third valve V3 is open.

A master sensor can be arranged in proximity to the tank and is used to control the hydraulic station and regulate pressure in the hydrogen tank according to cycles defined by the operator with the man/machine interface.

As is visible in FIG. 1, the hydraulic unit can comprise a fourth duct C4 comprising a fourth valve V4 and a fifth duct comprising a fifth valve V5. The fourth duct connects the second chamber of the first multiplier to the hydraulic station, and the fifth duct connects the second chamber of the second multiplier to the hydraulic station CH. The fourth duct C4 may comprise a pressure sensor P4 and the fifth duct C5 may comprise a pressure sensor P5.

The hydraulic supply unit operates in a closed circuit by means of the first, second, third, fourth and fifth ducts described previously, with a common return circuit and separation for the low-pressure return from each multiplier M1, M2 by means of the fourth V4 and fifth V5 valves. A cold fluid circuit 15 can be provided to cool the hydraulic station CH during operation. This cold fluid circuit can have a temperature below 10° C., preferably around 7° C. The fluid in this cold fluid circuit may be water. Heat exchange means can be arranged so as to cool the first fluid leaving the hydraulic station to the first chambers 104 of the multipliers M1, M2. These heat exchange means can comprise at least one portion of the cold fluid circuit and can be arranged between the first valve V1 and the second valve V2. In this way, the first fluid reaches the first chambers 104 with a controlled temperature.

The pressure multiplier unit makes it possible to transform the first fluid pressure provided by the hydraulic station CH into a higher pressure in the second circuit of second fluid.

Each multiplier comprises two distinct and mutually sealed parts, namely a first cylindrical body part receiving the first fluid and a second cylindrical body part receiving the second fluid.

The volume of the low-pressure part can be at least 80 liters, for example 95 liters. The internal diameter of the first cylindrical body part can be about 275 mm. The volume of the second cylindrical body part can be at least 20 liters, for example 23 liters. The internal diameter of the second cylindrical body part can be 150 mm. Each multiplier can be several meters high, for example 4 meters. By using the full stroke of a multiplier, it is possible to generate a second fluid pressure of at least 900 bar and, for example, up to 1050 bar when the full volume of the second cylindrical body is used. The ratio of the cross-sectional areas of the first cylindrical body part, which can be cycled from 0 to 350 bar, and the second cylindrical body part, which can be cycled from 0 to 1050 bar, is 3. The multipliers M1, M2 are positioned vertically to minimize seal wear. The precise structure of the multiplier will be subsequently described with reference to FIGS. 6 to 12. These multipliers M1, M2 are preferably identical and can operate simultaneously. The main advantage of coupling the hydraulic station with at least two multipliers is that it is possible by virtue of the reduced dimensions of each multiplier and the damping on the multiplier side:

- to program precise pressure variation cycles (minimum pressure peak and maximum pressure peak curves are regular and reproducible),
- to vary the pressure rise and fall rate, i.e. the flow rate, and to have constant pressure rise or fall rates during the cycles, and
- to use multipliers M1, M2 having a useful volume in the second cylindrical body part 102 which can be twice as small as the volume variation of the tank under test. Thus, overall size is minimized and precision maintained.

Each multiplier can be associated with a retention or recovery tank B1, B2 designed to recover any leaks of the first fluid and/or the second fluid. Each retention tank B1, B2 can be associated with a level, for example optical, sensor N1, N2, to detect the presence of liquid in the tank and as a result the existence of at least one leak. Each sensor can be connected to the man/machine interface and/or lead to an automatic shutdown of the cycling facility.

A fluidic tapping 105 is made in the second chamber 106 of the first cylindrical body part 100 and makes it possible to measure position of the rod of multiplier M1, M2 by measuring the level of first fluid in the tapping duct.

The facility includes a feed circuit for automatically filling the second cylindrical body part of each multiplier, and for ensuring that the second circuit is perfectly fluidly connected to the second the cylindrical body part, without any air bubbles in the second circuit.

As previously indicated, the cycling facility includes a unit U3 for managing the second fluid, which is configured to enable management of a high-pressure fluid. This unit U3 includes a tank R3 for a second fluid, which may be water. This unit U3 can be supplied with cold water from a general supply of the building housing the facility. This unit U3 is fluidly connected to the multipliers M1, M2. More particularly, the tank R3 for the second fluid is connected through a duct C6 to a connecting duct C7 which connects the multipliers M1, M2 to the controllable-temperature enclosure unit U5.

Unit U3 performs at least one of the following functions:
Supplying the second circuit with second fluid,
Feeding the second fluid into the high-pressure circuit,
Overpressure protection,
keeping safe by pressure venting,
Draining the second circuit with the second fluid, Managing the volume variation of the second fluid in the second circuit, this volume variation being related to temperature variations and is managed via a 5L accumulator at 30 bar, chilled water overpressure for heat exchanger consumption The cycling facility also includes a unit U4 for managing the third fluid inside the hydrogen tank to be tested within the enclosure of the unit U5 with controllable temperature enclosure. This unit U4 includes a tank R4 of several hundred liters designed to be filled with the third fluid, for example about 400 liters.

The unit U4 enables the following functions:

Supplying with the third fluid the hydrogen tank to be tested, which is housed in the controllable temperature enclosure of the unit U5, Feeding the third circuit and the tank to be tested as well as the separators EP1, EP2 (subsequently described) with the third fluid, Overpressure protection, keeping safe by pressure venting of the third circuit, Draining the third circuit, Managing fluid volume variations with a 25L 30 bar accumulator.

Unit U5 is subsequently described with reference to FIG. 5.

The unit U6 for air treatment in the building housing the facility. This unit includes a system of compressed air to a few bars, about 6 to 7 bar.

The unit U7 for testing a tank 11 at room temperature is housed in a dedicated enclosure and includes a tank bypass device including three valves V15, V16 and V17.

Figure 4:
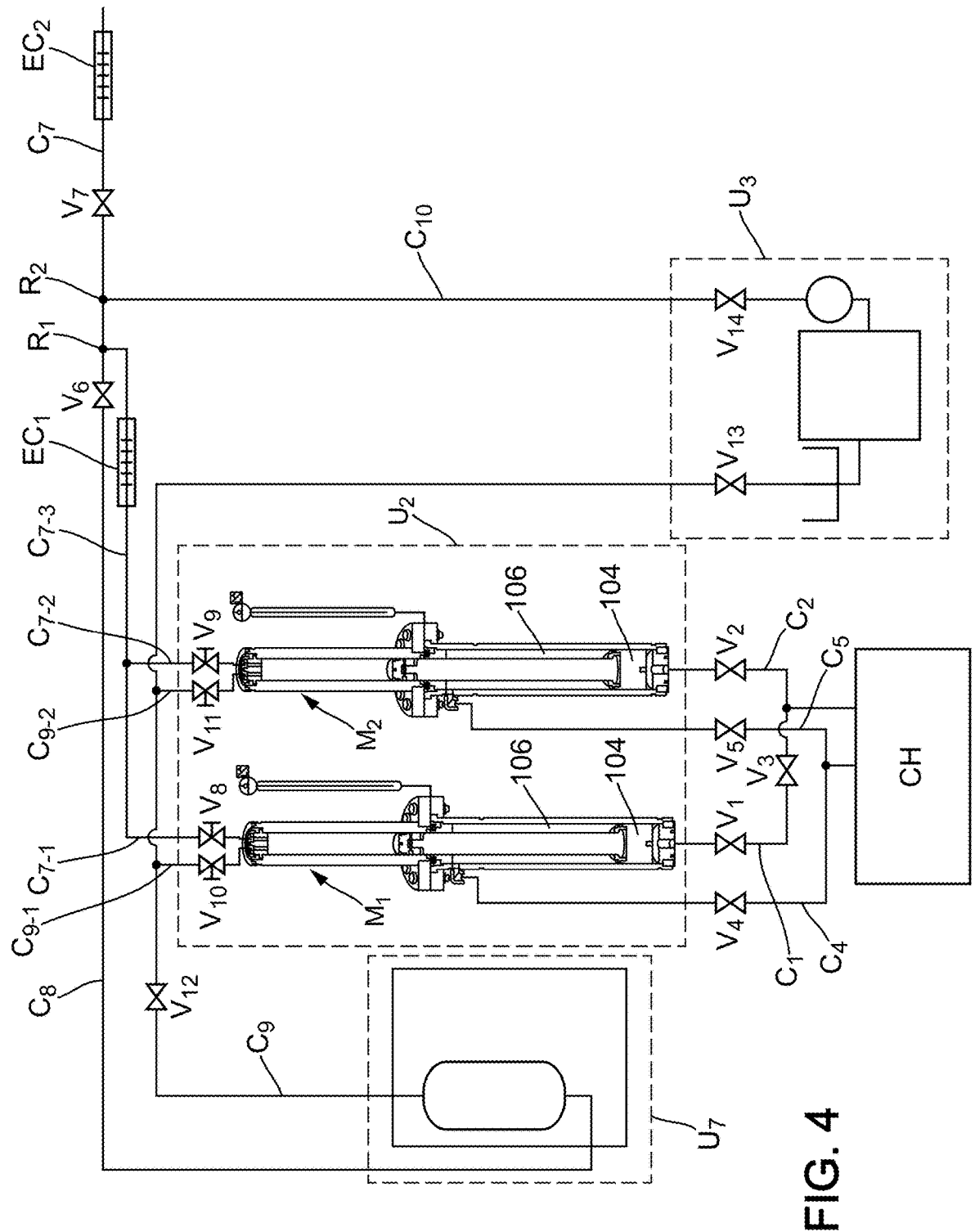
FIG. 4 illustrates the pressurization unit connected to the first circuit, the second circuit as well as a feed circuit supplied with the second fluid°.

As illustrated in FIG. 4, the second circuit includes the duct C7 connecting the multipliers to the third circuit, and more precisely to pressure exchangers E1, E2. The duct C7 divides into two ducts C7-1 and C7-2 for fluid connection with the interior of the second cylindrical body part of the multipliers M1, M2. The duct C7 includes two heat exchangers EC1, EC2. The exchangers EC1, EC2 can be supplied with cooling fluid from the cold fluid circuit 15 previously described. The second circuit includes two valves V6 and V7, valve V7 being arranged between both heat exchangers EC1, EC2 arranged in the duct C7. The valve V6 is arranged so that this first connection point R1 of the ducts C7-1 and C7-2 to the duct C7 is located between the valves V6 and V7. Heat exchanger E1 can be arranged between this connection point and a portion of duct C7-3 connecting ducts C7-1, C7-2 to duct C7. A duct C8 includes the valve V6 and connects a bottom end of the tank XX to the first connection point R1. The duct C7-1 comprises an eighth valve V8 and the duct C7-2 comprises a ninth valve V9.

The circuit for feeding or filling the multipliers with the second fluid comprises a ninth duct C9 connecting the top end of the tank to the multipliers M1, M2, more precisely to the high-pressure chambers 103, this duct extending to the second-fluid tank of unit U3. A tenth duct C10 comprising a fourteenth valve V14 connects the tank to the duct C7 and to a second connection point R2 arranged between the first connection point R1 and the valve V7. Each multiplier M1, M2 is connected to the ninth duct C9 via a duct C9-1, C9-2 providing fluidic connection with the interior of the second cylindrical body part of the multipliers M1, M2. The duct C9-1 comprises a tenth valve V10 and the duct C9-2 comprises an eleventh valve V11. The ninth duct C9 comprises a twelfth valve V12 arranged between the tank and ducts C9-1 and C9-2, and includes a thirteenth valve V13 arranged between ducts C9-1 and C9-2 and the second-fluid tank. The tenth duct C10 comprises a fourteenth valve V14.

Tenth valve V10, eleventh valve V11 and twelfth valve V12 are three-way valves comprising an air vent and are substantially arranged at a same top point of the second circuit. The other valves are two-way valves.

To fill the high-pressure parts of the multipliers M1 and M2, the following is carried out:

The first V1 and second V2 valves are opened and pressurization of the first chamber 104 of each multiplier M1, M2 is performed;

Secondly, the fourth valve V4 and the fifth valve V5 are opened when the piston is in the top position, so as to allow the first fluid to flow into an oil tank RH of the unit U1 via the fourth duct C4 and the fifth duct C5.

the seventh valve V7, the eighth valve V8, the ninth valve V9, the thirteenth valve V13 being in the closed position and the tenth valve V10, the eleventh valve V11, the fourteenth valve V14 and the fifteenth valve V15 or bypass valve being in the open position, second fluid stored in the tank of unit U3 is pumped into the tenth duct C10, so as to circulate second fluid through the tenth duct C10, eighth duct C8, tank of unit U7, ninth duct C9, ducts C9-1, C9-2. When second fluid flows through vents of the valves V10, V11, and V12, the filling or feeding procedure of the second cylindrical body part is completed.

This feed procedure enables the high-pressure parts of the M1 and M2 multipliers to be filled, while making sure that there is no air in the multipliers.

Figure 5:
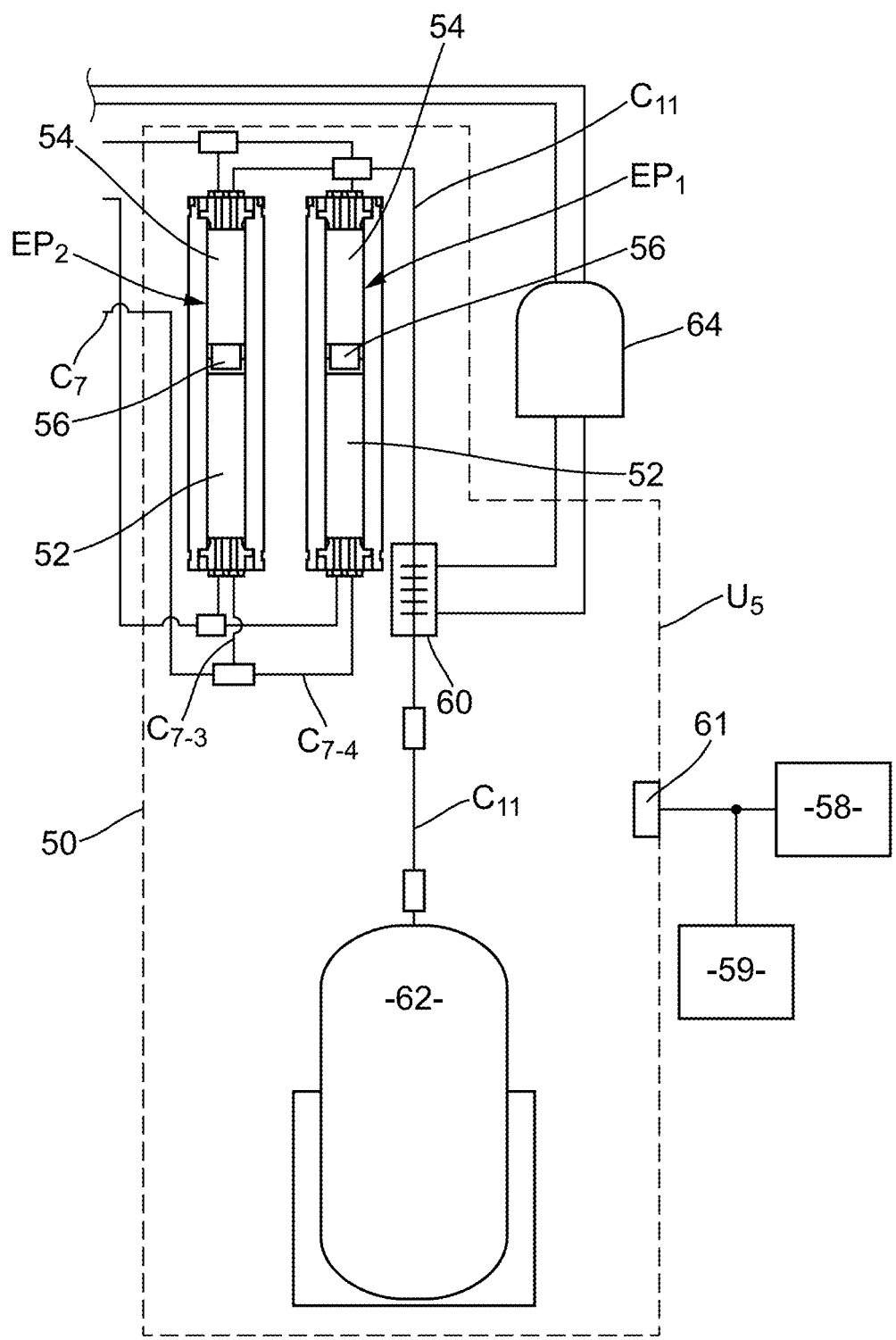
FIG. 5 illustrates an extreme-temperature cycling unit of the facility of FIG. 1.

It is observed that closing valves V8 and V9 enables isolation of ducts C7-1 and C7-2 during feed or maintenance operations, which explains why it is not necessary to refill them after a phase operation FIG. 5 which represents the extreme temperature cycling unit U5 is now referred to. As can be seen in FIG. 5, the seventh duct C7 of the second circuit passes through and extends inside the enclosure 50. The duct C7 divides into two ducts C7-3 and C7-4, each in fluid communication with a first chamber 52 of a pressure exchanger EP1, EP2. Each pressure exchanger EP1, EP2 comprises a second chamber 54 opposite to the first chamber 50 with respect to a piston 56 and including the third fluid. The second chambers 54 are connected to an eleventh duct C11 designed to be fluidly connected to the inlet of a tank to be tested.

The cycling facility comprises means 58 for cooling and controlling temperature in the enclosure 50 and temperature of the third fluid in order to prevent the third fluid from overheating and leading to invalid cycling tests.

The enclosure 50 is thus thermally insulated from the outside by insulating means arranged on the inner and/or outer faces of the enclosure 50. The unit U5 comprises cooling means 58 and/or heating means 59 which are connected to blowing means 61. In this way, it is possible to carry out tests at extreme temperatures in the enclosure of the unit U5, i.e. at both low and high temperatures.

More particularly, to prevent overheating of the portion of the seventh duct C7 of the second circuit which extends inside the enclosure, it is possible to provide means for thermally insulating this portion of duct C7. These means may comprise heating means which may, for example, comprise heating cables (not represented).

In addition, at each cycling, heating occurs at the inlet neck of the hydrogen tank as a result of the venturi effect created at the neck by the decrease and subsequent increase in the flow cross-section area. Thus, each cycle produces a temperature rise in the order of a few degrees, depending on the cycling parameters and the dimension of the tank neck under test. In practice, a temperature rise of about 7 degrees has already been noticed. To avoid this temperature rise, a heat exchanger 60 is added to the third circuit, thus lowering temperature of the third fluid. This exchanger 60 may surround a portion of the third circuit to be connected to the tank 62 to be tested. In order to have an optimum cold source, it is possible to use a cryostat 64 connected to the heat exchanger 60, the heat exchanger comprising a coil surrounding, for example, part of the eleventh duct C11.

FIGS. 6 to 12 which relate to a multiplier are now referred to. According to the present document, during operation the multipliers M1, M2 are used in a vertical position, thus avoiding asymmetrical wear of the sealing parts.

In the description, a multiplier M1, M2 will be described. The characteristics described apply to either or both multipliers.

Each multiplier M1, M2 comprises a longitudinal axis L and includes a cylindrical body comprising a first cylindrical body part 100 for receiving the first, low-pressure fluid and a second cylindrical body part 102 for receiving the second, high-pressure fluid. Thus, it is noticed that the inner cross-section area of the first cylindrical body part 100 is greater than the inner cross-section area of the second cylindrical body part 102. The first cylindrical body part 100 comprises a first bottom chamber 104 and a second top chamber 106 separated from each other by a piston 108 which is connected to a piston rod 110 slidably extending into the second cylindrical body part 102. The second cylindrical body part 102 internally comprises a chamber 103 delimited by a removable cartridge 116 and a shutter member 118. The ratio between the two cross-section areas, as well as the displacement stroke of the piston, determine the pressure multiplier ratio between the first cylindrical body part 100 and the second cylindrical body part 102.

The piston rod 110 comprises a first end 112 connected to the piston 108 and a second end 114 carrying the removable cartridge 116 able to sealingly slide into the second cylindrical body part 102, more particularly on the inner surface of the second cylindrical body part 102 delimiting the chamber 103. It is noticed that the end of the second cylindrical body part 102 comprises an open end which can be shuttered by the shutter member 118 which is removable so as to allow easy and quick access to and ensure maintenance of the sealing cartridge as will be apparent from the following.

The shutter member illustrated in FIG. 7 in cross-section view along a cross-sectional plane and in perspective view in FIG. 8 comprises two through ducts 119 extending longitudinally, one of which is connected to ducts C7-1, C7-2 and C9-1, C9-2 (see FIG. 4) for, respectively, transmitting 119 pressure during operation and feeding the multiplier M1, M2 as previously discussed.

As represented in FIGS. 7 and 8, the shutter member may comprise an annular rim 120 engaged in abutment, along a first direction L1 of the longitudinal axis, on a corresponding annular shoulder 122 of the second cylindrical body part 102.

The shutter member may comprise a first cylindrical part 124 and a second cylindrical part 126 separated from each other by the annular rim 120 of the shutter member 118.

The first cylindrical part 124 may comprise an outer thread 124a for screwing it onto a corresponding thread of the inner surface of the second cylindrical body part 102. In order to provide sealing between the shoulder 122 and the annular rim 120 of the shutter member, a first annular, preferably toroidal, seal 127, for example of Teflon, can be arranged between the thread 124a and the annular rim 120 of the shutter member 118.

A second annular seal 128 can be clamped between the annular rim 120 of the shutter member 118 and an inner cylindrical surface of the second cylindrical body part 102, this second annular seal 128 being for example of thermoplastic material.

Figure 9A:
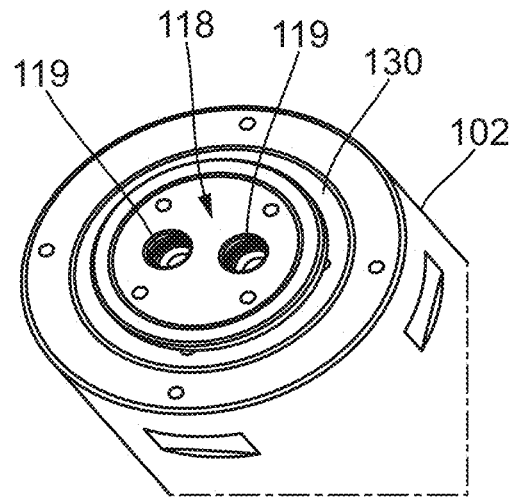
FIG. 9 comprises three parts A, B and C respectively named FIGS. 9A, 9B and 9C in the detailed description below, which illustrate the successive steps of disassembling the shutter represented in FIGS. 7 and 8.
Figure 9B:
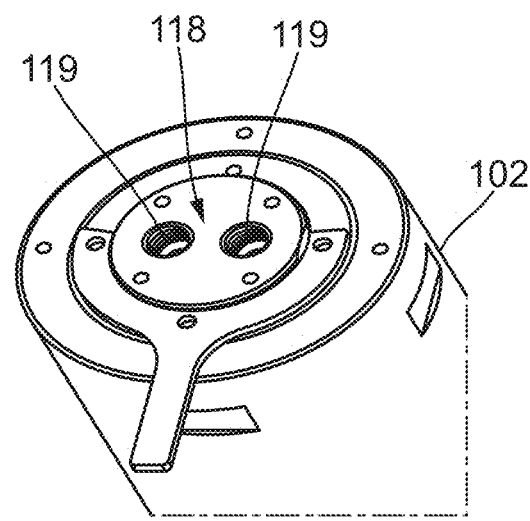
Figure 9C:
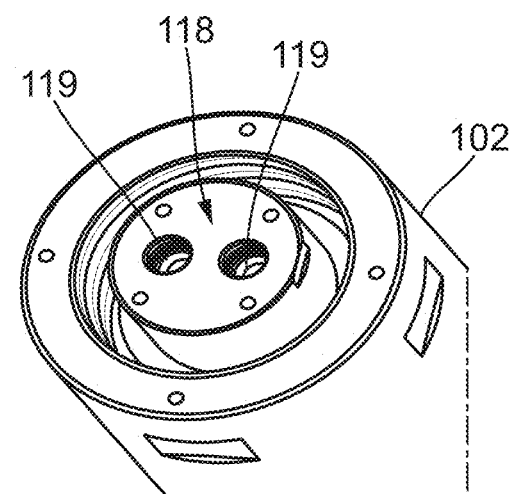

When the shutter member 118 is tightly screwed onto the shoulder 122 of the second cylindrical body part 102, it can be blocked in position, i.e. in translation, along a second direction L2 of the longitudinal direction L, by an annular yoke 130 screwed onto a thread of an inner surface of the second cylindrical body part 102. The yoke is illustrated in FIG. 9A. FIG. 9B illustrates disassembly of the yoke by virtue of means for attaching a yoke clamping/unclamping member. These attachment means are here ports allowing mating of the member or tool with the yoke to enable the clamping or unclamping thereof. FIG. 9C illustrates the shutter member in the clamped position, the yoke being disassembled and therefore not represented.

FIG. 10 illustrates the cartridge in its extended position relative to the second cylindrical body part 102. This position can be achieved by moving the piston to the top position by means of pressure applied in the first chamber of the multiplier M1, M2.

Figure 11:
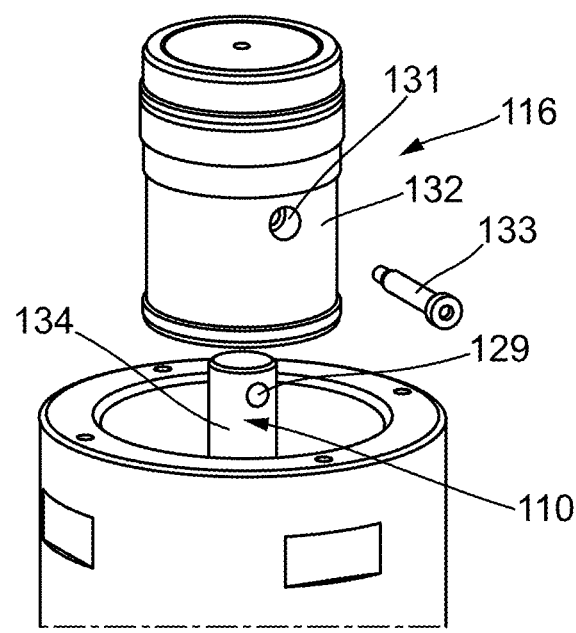
FIG. 11 illustrates a schematic perspective view of disassembly of the sealing cartridge of FIG. 10.

As illustrated in FIGS. 10b and 10C, the cartridge may comprise blocking means on the free end of the piston rod, these blocking means may comprise a pin device. A port 129 can be formed at the end 114 of the rod 110 for being positioned facing a port 131 of the cartridge 116, a pin 133 being mounted in the ports 129, 131. The cartridge 116 may include a first cylindrical part 132 connected through a radial annular shoulder to a second cylindrical part 134 whose end opposite to the first cylindrical part 132 includes an outer thread 136 (FIG. 11).

Figure 12A:
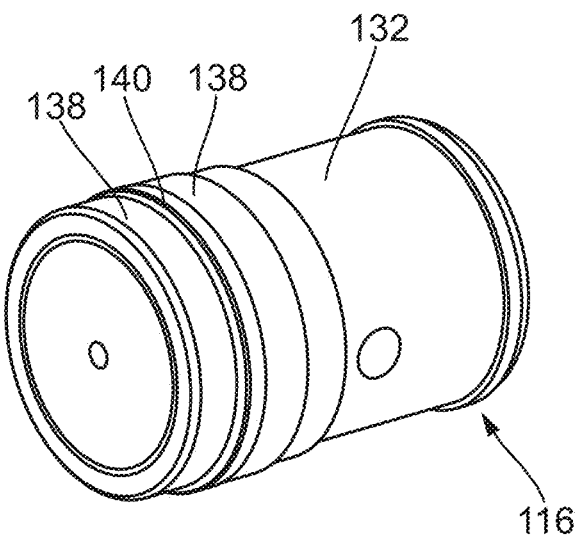
FIG. 12 comprises three parts A, B and C respectively named FIGS. 12A, 12B and 12C in the detailed description below, which illustrate the successive steps of disassembling the constituent parts of the cartridge.
Figure 12B:
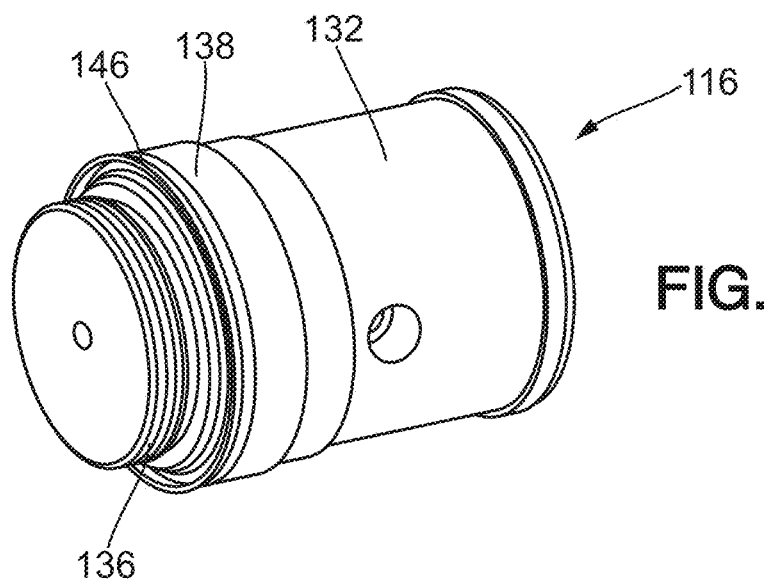
Figure 12C:
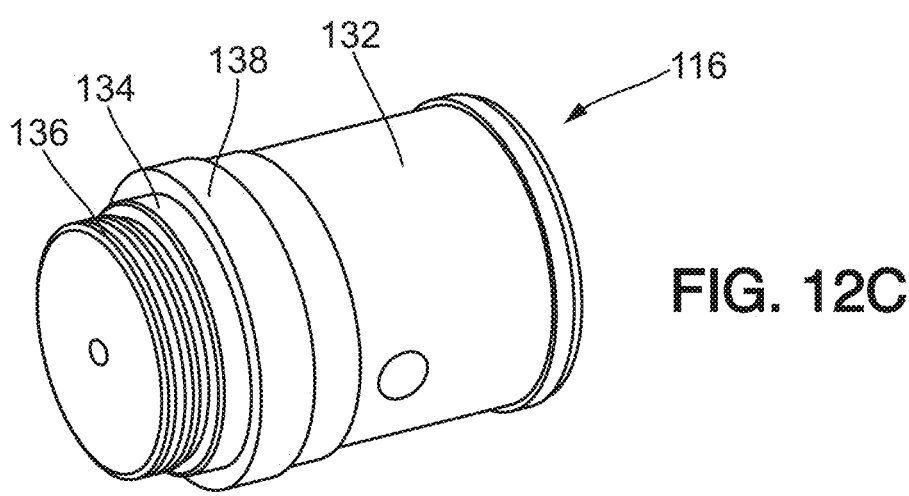

The second cylindrical body part 134 can accommodate two annular rings 138, between which an annular seal 140, for example a double-lip seal, is interposed. An annular ring 138 is screwed onto the outer thread 136 in order to block the assembly of the two rings and the seal onto the second cylindrical part 134 of the cartridge 116. FIGS. 12A, 12B and 12C illustrate the successive disassembly of the annular ring 138 screwed onto the second cylindrical part 134 (FIG. 12B), followed by the annular seal 140 (FIG. 12C).

The invention claimed is:

1. A hydraulic cylinder for a hydrogen tank pressurization installation, comprising a cylindrical body of longitudinal axis having a first low-pressure cylindrical body portion and a second high-pressure cylindrical body portion, a piston being mounted in the first cylindrical body portion and being mounted at a first end of a piston rod slidably extending in the second cylindrical body portion, wherein a second end of the rod opposite the first end carries a removable cartridge slidably sealed in a second part of the cylindrical body, the second part of the cylindrical body being sealed by a removable shutter member arranged longitudinally opposite the removable cartridge, wherein the shutter member is locked in translation, along a second direction of the longitudinal direction, by an annular yoke screwed onto a thread of an internal surface of the second part of the cylindrical body.

2. The hydraulic cylinder according to claim 1, wherein the annular yoke comprises means for attaching a yoke clamping/unclamping member.

3. The hydraulic cylinder according to claim 1, wherein the removable cartridge comprises an annular seal locked longitudinally by annular clamping rings.

4. The hydraulic cylinder according to claim 1, wherein the cartridge is locked by a pin device on a longitudinal extension of the rod inserted in the cartridge.

5. The hydraulic cylinder according to claim 1, wherein the first portion of the cylindrical body may comprise a first chamber and a second chamber separated from each other by the piston, the first chamber and the second chamber being intended to be supplied with a first fluid.

6. The hydraulic cylinder according to claim 1, wherein the shutter member comprises an orifice for passage of a pressurized fluid housed in the second cylindrical body portion.

7. A hydraulic facility comprising at least one hydraulic cylinder according to claim 1, wherein the first cylindrical body portion is connected to a first circuit of a first low-pressure fluid and the second cylindrical body portion is connected to a second circuit of a second high-pressure fluid.

8. The hydraulic facility of claim 7, wherein the shutter member comprises at least one longitudinally extending channel fluidly connecting an interior of the second cylindrical body portion to the second circuit.

\* \* \* \* \*